(12) United States Patent  (10) Patent No.: US 6,693,369 B2
Aubry                     (45) Date of Patent:    Feb. 17, 2004

(54) ENERGY DISTRIBUTION, ESPECIALLY TO ELEMENTS OF A MOTORVEHICLE AIR-CONDITIONING DEVICE

(75) Inventor: Vincent Aubry, Orsay (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 10/006,375

(22) Filed: Dec. 10, 2001

(65) Prior Publication Data

US 2002/0070609 A1 Jun. 13, 2002

(30) Foreign Application Priority Data

Dec. 11, 2000 (FR) ............................................ 00 16057

(51) Int. Cl.[7] ................................................ B60L 1/00
(52) U.S. Cl. ......................... 307/10.1; 307/31; 307/34; 307/66
(58) Field of Search ..................... 307/66, 10.1, 31, 307/34; 701/36; 62/184; 180/62.5; 361/23; 318/434, 430, 41, 42; 323/303, 299

(56) References Cited

U.S. PATENT DOCUMENTS 3,809,999 A  *  5/1974  Cantrell ....................... 323/17
5,079,437 A     1/1992  Monroe
5,477,091 A  * 12/1995  Fiorina et al. ................. 307/26
5,990,573 A  * 11/1999  Granitz et al. ............. 307/10.1
6,016,965 A  *  1/2000  Yoshimura et al. ...... 123/41.12
6,304,803 B1 * 10/2001  Dao ............................ 165/140

FOREIGN PATENT DOCUMENTS

DE    196 21 555 C1   8/1997
EP    0 805 540 A1   11/1997

* cited by examiner

Primary Examiner—Brian Sircus
Assistant Examiner—Robert DeBeradinis
(74) Attorney, Agent, or Firm—Ronald Courtney

(57) ABSTRACT

A voltage-regulation, protection and filtering assembly (20) is connected between a power-supply input and an energy output in order to deliver the same security-protected operating voltage to a number of elements (12a, 12b, 12b, 12c, 14, 16) via an energy bus (26) linked to the energy output. The assembly (20) further includes an information input for connection to a first information bus (24), an information output for connection to an information bus (26) specific to the elements, and a monitoring circuit for transferring, on the specific information bus, the information relating to the said elements flowing on the first information bus, and visa versa.

6 Claims, 3 Drawing Sheets

ENERGY DISTRIBUTION, ESPECIALLY TO ELEMENTS OF A MOTORVEHICLE AIR-CONDITIONING DEVICE

BACKGROUND OF THE INVENTION

The invention relates to the energy supply to elements supplied with voltage in motor vehicles, and, more particularly, but not exclusively, to the energy supply to elements of air-conditioning devices.

In addition to a motor-driven fan unit producing the blown airflow, the air-conditioning devices of motor vehicles comprise a number of elements operating under an energy supply, such as the actuators of air-mixing and distribution flaps, elements of the control panel for the air conditioning, and sensors, especially temperature probes.

In the usual way, the motor-driven fan, as well as the other elements of the air-conditioning device, are supplied from a main energy bus of the vehicle conveying the voltage from the battery.

With each element, a circuit has to be associated, having the purposes of:

carrying out filtering and protection against the electrical "pollution" present on the main energy bus, and delivering one or more regulated voltages for logic control circuits or analog interfaces such as interfaces for supplying windings of stepper motors, for example, constituting actuators of flaps.

The electrical "pollution" is generally substantial in a vehicle: pulses, transient waves, overvoltages, breaks, electromagnetic interference, accidental polarity reversals, fluctuation, etc.

Furthermore, the supply of regulated voltage for logic circuits requires a change from a battery voltage of 12 V or 24 V, or even 42 V in the future, to a voltage of 5 V or less with new generations of components.

Even if filtering, protection and regulation circuits functioning satisfactorily under such conditions can be produced at low cost, they generate a substantial heat dissipation. The sophistication of air-air-conditioning devices requires an ever-increasing number of elements to be supplied with voltage. The overall cost of the filtering, protection and regulation circuits becomes not inconsiderable, and their total heat dissipation becomes very substantial which, when the air-conditioning device is operating in refrigeration mode, affects the usable cooling capacity.

OBJECTS AND SUMMARY OF THE INVENTION

The object of the invention is to remedy these drawbacks and, to that end, it proposes a unit for distributing energy to elements of an air-conditioning device or, more generally, to a number of elements supplied with electrical energy in a motor vehicle.

This unit includes an energy-supply input for receiving an input voltage, an energy output, and a voltage-regulation, protection and filtering assembly connected between the power-supply input and the energy output so as to deliver the same security-protected operating voltage to the said elements via an energy bus linked to the energy output.

Thus, with the various elements being connected to a security-protected energy bus, the electronic circuits for processing the received energy which are associated with these elements can be limited to circuits which may be present for step-down and regulation of voltages for the power supply to logic circuits or to particular analog interfaces.

The energy-distribution unit may further include an information input for connection to a first information bus, an information output for connection to an information bus specific to the said elements, and a monitoring circuit for transferring, on the specific information bus, the information relating to the said elements flowing on the first information bus, and conversely.

By virtue of this arrangement, the energy-distribution unit constitutes both an energy gateway and an information gateway between, on the one hand, an energy bus and an information bus of the vehicle and, on the other hand, an energy bus and a specific information bus.

Advantageously then, the monitoring circuit comprises means for distributing, in time, the energy distributed to the various elements, by time-shifting, as required, of the orders addressed to these elements via the specific information bus.

Thus an energy-distribution and management system is available, which makes it possible to limit the power to be delivered at any instant and thus the dimensioning of the voltage-regulation, protection and filtering assembly, and of the security-protected energy bus.

A further subject of the invention is a motor-vehicle air-conditioning device comprising a motor-driven fan unit and a number of elements supplied with voltage, the device comprising an energy-distribution unit as defined above and a security-protected energy bus linked to the energy output of the energy-distribution unit and powering the said elements.

The energy-distribution unit can be installed in the motor-driven fan unit, and more particularly in a motor-control module. It is then possible to make available, at the energy-supply input, the pre-filtered voltage supplied to the motor-driven fan. More particularly, the distribution unit receives a filtered voltage from a filtering circuit of the motor-control module of the motor-driven fan unit, while taking advantage of the airflow produced by the latter to remove the dissipated heat.

It is possible, however, to install the energy-distribution unit in the control panel for the air-conditioning, or in the form of an independent module.

BRIEF DESCRIPTION OF THE DRAWINGS

The invention will be better understood on reading the description given below, for informative but not limiting purposes, by reference to the attached drawings, in which.

DETAILED DESCRIPTION OF EMBODIMENTS

Figure 1:
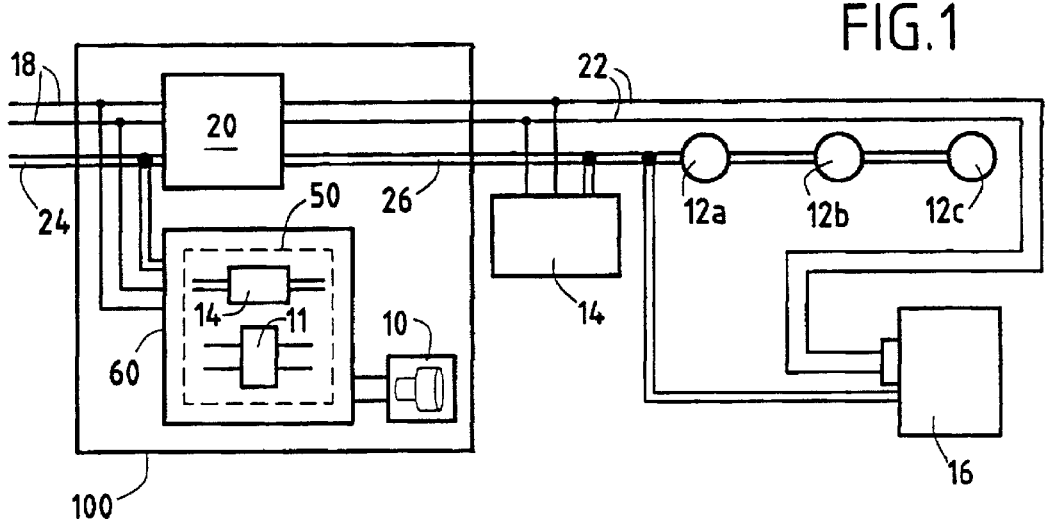
FIG. 1 is a very general diagram of a motor-vehicle air-conditioning device according to one implementation of the invention.

FIG. 1 very diagrammatically shows various components of a motor-vehicle air-conditioning device, namely a motor-driven fan unit 100 intended for producing a blown airflow and a number of other elements comprising a set of actuators 12a, 12b, 12c for the control of distribution flaps for the airflow, a panel 14 for control of the air-conditioning and one or more sensors 16 such as temperature sensors, insolation sensors, etc.

The motor-driven fan unit 100 comprises a motor 10 for driving a turbine and a motor-control module 60 which makes it possible to drive the motor at a rotational speed which is variable as a function of the air throughput desired in the motor-driven fan unit 100.

The module 60 includes a printed-circuit card on which is arranged a set 50 of electrical circuits known to the person skilled in the art, making it possible to monitor the speed of the motor 10.

The printed-circuit card is thermally coupled in a normal way with a radiator (not represented).

Among these various circuits, the set 50 includes a filtering circuit 11 which receives the voltage from the battery of the vehicle and carries out functions of filtering and of protection against overvoltages, in a way which is well known. The set 50 also includes a monitoring circuit or microcontroller 40, which manages the power which is to be delivered to the motor, in a well-known way.

The actuators 12a, 12b, 12c are generally stepper motors. Although only three are represented in FIG. 1, for the sake of simplicity, the number of them can be much higher.

The electrical energy necessary for the operation of the air-conditioning device is supplied by a main energy bus 18 consisting of a pair of conductors linked to the battery of the vehicle.

The bus 18 supplies the motor-driven fan unit 10 as well as, in accordance with the invention, an energy-distribution unit 20 which delivers a regulated and security-protected voltage on an energy bus 22 supplying the other elements of the air-conditioning device in common.

In that way, at the level of each of these elements, it is not worthwhile providing for voltage-protection and filtering means. Voltage-regulation circuits may possibly be necessary in order to supply logic or analog voltage levels required.

In the embodiment illustrated, the energy-distribution unit 20 also constitutes an interface between a first information bus 24 and an information bus 26 specific to the air-conditioning device. The bus 26 serves the elements 12a, 12b, 12c, 14, 16 so as, by addressing, to route the information intended for them, for example, position-datum information for airflow-distribution flaps, and information transmitted by them, for example reflecting the status of the control panel, or the measurements from the sensors or the actual positions of the flaps.

It will be noted that the connection of elements of a vehicle air-conditioning device on a common bus in order to provide an information link with a central unit (not represented here) is known in itself. In the example considered here, the bus 24 can be a general bus on which flows information involving various functional members of the vehicle, or a bus dedicated to the air-conditioning device but differing from the bus 26.

Figure 2:
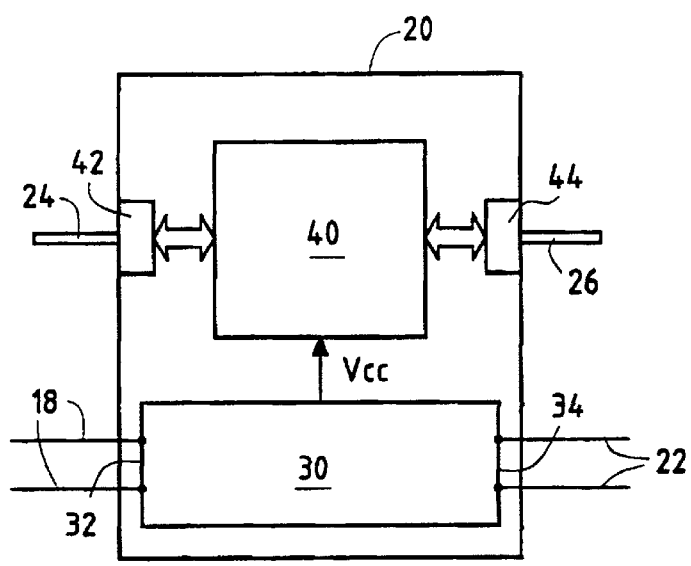
FIG. 2 is a diagram of an embodiment of the energy-distribution unit included in the device of FIG. 1.

One embodiment of the energy-distribution unit 20 is illustrated diagrammatically by FIG. 2.

The unit 20 comprises a voltage-regulation, protection and filtering assembly 30 having an energy input 32 connected to the main energy bus 18, and an energy output 34 connected to the security-protected energy bus 22. The unit 20 further comprises a monitoring circuit or microcontroller 40 linked to a first bus interface 42 linked to the information bus 24 and to a second bus interface 44 linked to the information bus 26.

Figure 3:
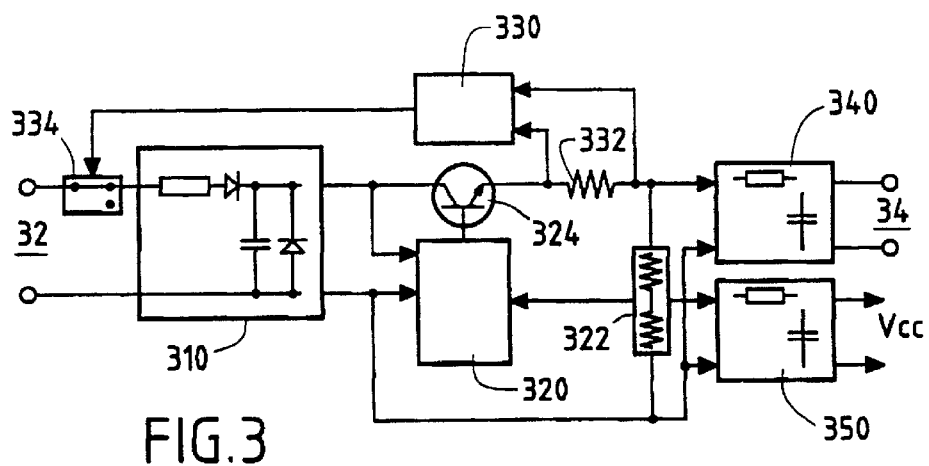
FIG. 3 is a diagram of the voltage-regulation protection and filtering assembly of the energy-distribution unit of FIG. 2.

The regulation, protection and filtering assembly 30 is produced in a conventional way. One embodiment is illustrated by FIG. 3 and will be described briefly below.

The assembly 30 comprises an input protection and filtering circuit 310, a voltage-regulation circuit 320, a current-protection circuit 330 and an output-filtering circuit 340.

The circuit 310 receives the voltage from the bus 18 on the input 32 and carries out functions of filtering and protection against overvoltages and transients by LC circuit and diodes, in a way which is well known.

The voltage-regulation circuit 320 receives, via a voltage divider 322, a voltage which is the image of that on the input of the output-filtering circuit 340, and drives a transistor 324 inserted between the circuits 310 and 340 in order to keep the voltage at the input of the output-filtering circuit 340 at the desired value.

The current-protection circuit 330 receives a voltage picked off from the terminals of a shunt 332 placed immediately upstream of the output circuit 340 and acts on a switch 334 so as to cut off the power supply at the input of the filtering circuit 310.

The output-filtering circuit 340 is a conventional LC-type circuit delivering a regulated and security-protected voltage on the energy output 34.

The assembly 30 also delivers a regulated power-supply voltage $V_{cc}$ for supplying the microcontroller 40, this voltage being picked up on the voltage divider 322 and filtered by an LC-type filtering circuit 350.

The microcontroller 40 is programmed to transfer the information from the bus 24 to the bus 26 and reciprocally, via the bus interfaces 42, 44. To that end, in a way which is well known in itself, the information flowing on one of the buses is read by the microcontroller and retransmitted on the other bus at its location and with the desired format in the frame used on this latter bus.

The microcontroller 40 is furthermore programmed in such a way as to manage the distribution of energy on the energy bus 22, so as to limit the maximum power which has to be delivered at any instant by the energy-distribution unit, and thereby to limit the dimensioning of the voltage-regulation, protection and filtering assembly 30, and of the energy bus 26.

That can be achieved by distributing, over time, the energy intended for various elements, in particular those requiring relatively substantial power. This relates especially to the actuators 12a, 12b, 12c which require the power necessary for supplying stepper motors via an analog interface.

The air and temperature regulation is managed by a central unit linked to the information bus 24. To each general command for a function such as recycling, demisting, foot-well distribution or ventilation distribution, there corresponds a sequence for activation of the flaps and of the motor-driven fan.

Figure 4A:
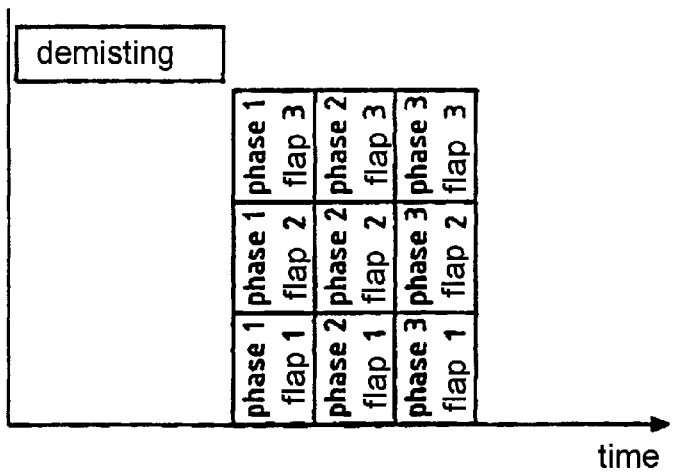
FIGS. 4A, 4B illustrate an example implementation of energy management by means of the energy-distribution unit of FIG. 2.

Thus, for example, as FIG. 4A shows, a demisting command can be interpreted, on the information bus 24, as a sequence comprising first phases of simultaneous driving of the stepper motors associated with flaps 1, 2 and 3, then second phases of driving of the flaps 1, 2 and 3 and third phases of driving of the flaps 1, 2 and 3.

The information read on the bus 24 and intended for the elements connected to the energy bus 22 are read by the microcontroller. The latter determines whether the energy is to be supplied simultaneously to several nodes of the bus 22 which are linked to respective elements, such as the nodes linked to the actuators. If so, the microcontroller 40 reorganises the command information read on the information bus 24 before reinjecting it onto the information bus 26 so as to distribute or offset over time the supply of energy to these various nodes.

Figure 4B:
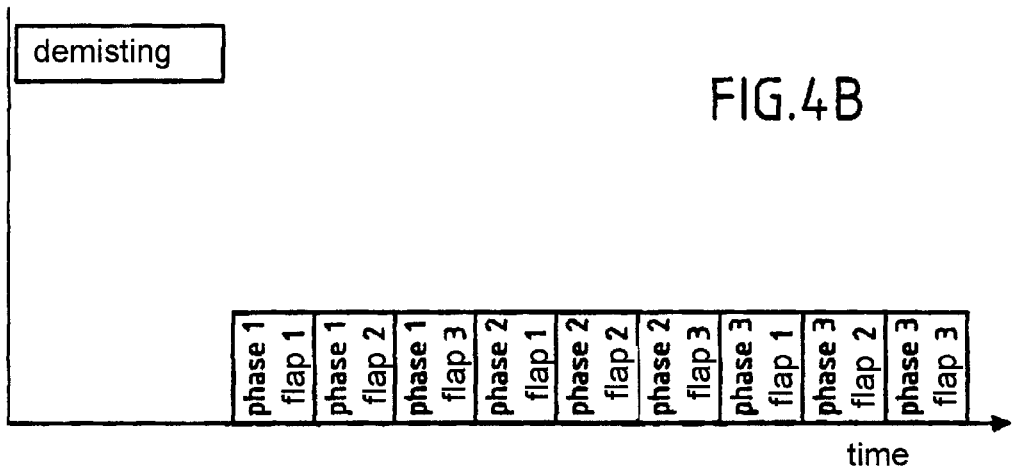

Thus, in the demisting-control case set out above, the phases of driving of the stepper motors are offset in time and interlaced as shown by FIG. 4B so as to inject, onto the information bus 26, a demisting command comprising a sequence formed by the various first phases of driving of the flaps 1, 2 and 3, followed by a series formed by the second phases of driving and of a series formed by the third phases of driving. At each instant, a single phase of driving is activated, which limits the current inrush.

More generally, depending on the number of elements which are to be activated simultaneously by supply of energy, as it emerges from the control information transported by the information bus 24, the microcontroller 40 retransmits this control information onto the specific information bus 26 with any time offset, so as to limit the number of elements to be activated in the same time, this number possibly being equal to one or more, possibly as a function of the type of elements in question, of their power consumption, etc.

The mounting of the energy-distribution unit 20 on the motor-driven fan unit 100 makes it possible to take advantage of the blown airflow produced by the latter in order to remove the heat energy dissipated by the unit 20.

Figure 5:
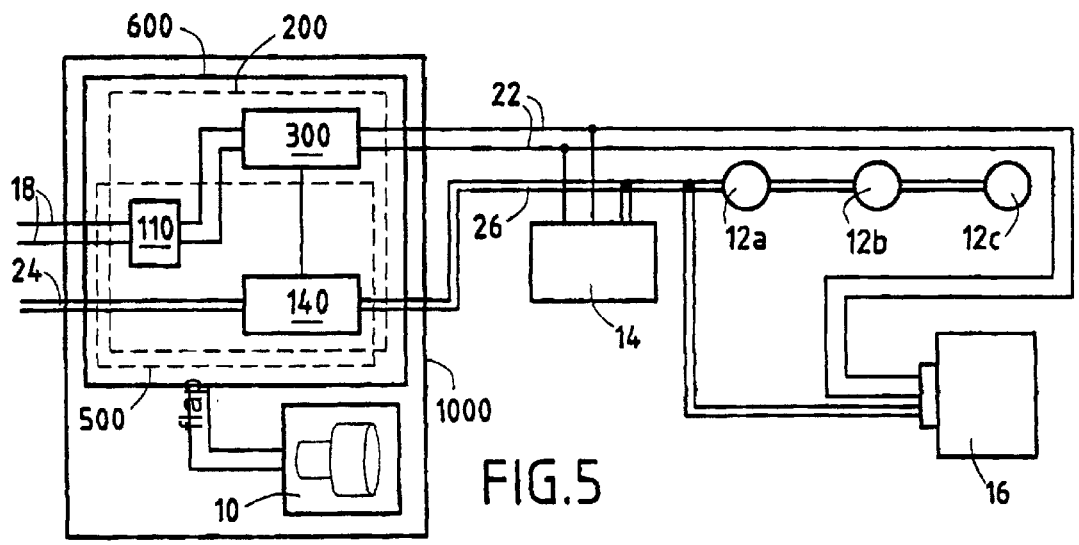
FIG. 5 is a diagram of a variant installation of the energy-distribution unit of FIG. 2.

In a variant embodiment illustrated in FIG. 5, the energy-distribution unit is now integrated into the motor-control module of the motor-driven fan unit, and now carries the references 200, 600, 1000 respectively. Advantageously, the energy-distribution unit 200 is mounted on the same printed-circuit support as the set of motor-control circuits now referenced 500.

Consequently, the filtering circuit 110 and the microcontroller 140 associated with the set 500 can be shared with the energy-distribution unit 200. For the sake of simplicity, only the connections relating to the energy-distribution unit 200 are represented on the drawing.

Thus, the energy-distribution unit 200 has available a pre-filtered voltage, which makes it possible, if appropriate, to simplify the filtering circuits comprised in the regulation, protection and filtering assembly, now referenced 300.

Likewise, the information buses 24 and 26 are linked to the microcontroller 140, further simplifying the energy-distribution unit while making it possible to satisfy the requirements for diagnosis thereof.

Furthermore, the current strength necessary for the energy-distribution unit 200 is about 3.5 A, compared with that flowing in the set 500 of motor-control circuits.

It will be seen that the installation of the energy-distribution unit 200 in the motor-control module 600 requires only an increase of about 10% in the power to be managed.

A principal advantage in the variant embodiment of FIG. 5 is the fact that the energy-distribution unit can use elements which are naturally present in a speed-control module.

The radiator, the support of the electronic components and a cap for protection against humidity and dust are shared with the speed-control module and the energy distributor, thus reducing the costs of manufacture and of assembly.

Another advantage is dimensional, since eliminating redundancy in the components used in common makes it possible to reduce the overall volume for the two functions.

The energy-distribution unit can also be mounted in the control module of an additional electric heater, particularly when the strength of the current managed by this module is very high, of the order of 100 A.

Figure 6:
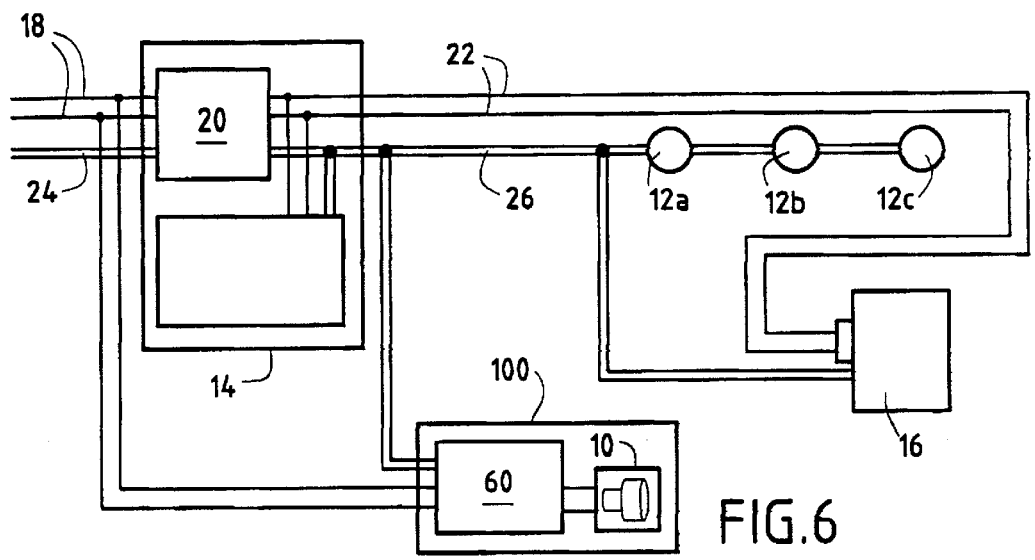
FIGS. 6 and 7 are very general diagrams of motor-vehicle air-conditioning devices according to other implementations of the invention.

It is possible, however, to mount the energy-distribution unit at other locations, for example within the ventilation control panel 14 as shown in FIG. 6. In contrast, in this case, the power to be managed will be doubled since the strength of the current necessary for the ventilation control panel is of the same order of magnitude (about 3A) as that managed by the energy distributor.

Figure 7:
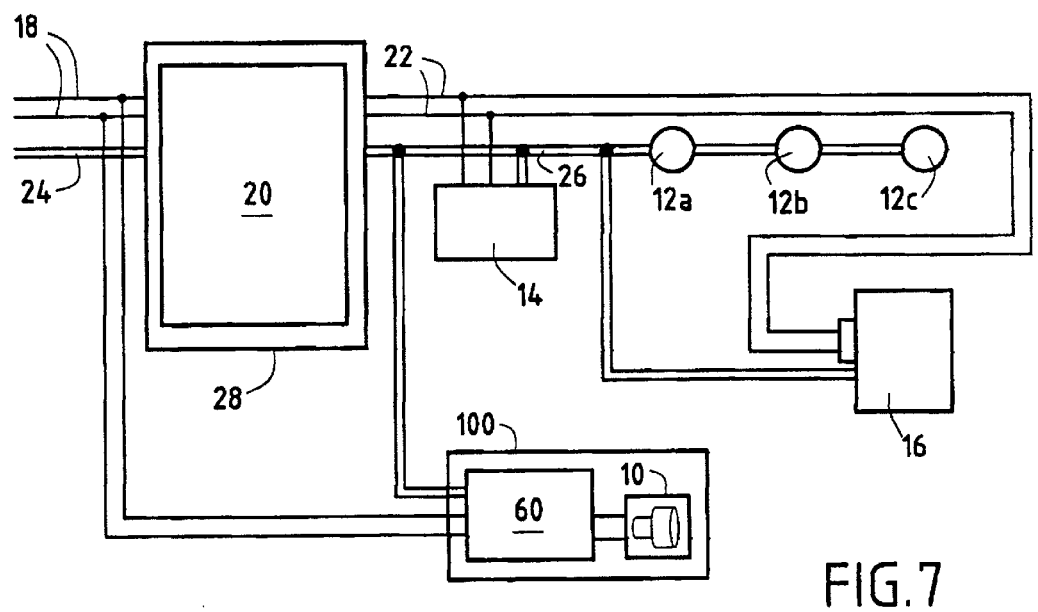

It is also possible for the energy-distribution unit to be in the form of an independent module 28 (FIG. 7) mounted, for example, on the air-conditioning housing carrying the actuators 12a, 12b, 12c. In these two embodiments, the motor-driven fan unit 10 is linked to the specific information bus 26.

Although the combination of the functions of energy gateway and of information gateway has been envisaged above within the energy distribution unit, the latter could be limited only to the function of energy gateway, physically represented essentially by the voltage-regulation, protection and filtering assembly 30.

What is claimed is:

1. A unit (20; 200) for distributing energy to a number of elements (12, 14, 16) supplied with voltage in a motor vehicle, comprising an energy-supply input (32) for receiving an input voltage (18), an energy output (34), and a voltage-regulation, protection and filtering assembly (30; 300) connected between the energy-supply input and the energy output so as to deliver the same security-protected operating voltage to said number of elements (12, 14, 16) via an energy bus (22) linked to the energy output (34), said unit further comprising, an information input for connection to a first information bus (24), an information output for connection to a second information bus (26) specific to said number of elements, and a monitoring circuit (40; 140) for transferring, on one of said first and second information bus, information relating to said number of elements (12, 14, 16) flowing on one of the first and second information bus, wherein, the monitoring circuit (40; 140) comprises means for distributing over time energy available to various elements as required by orders addressed to said various elements via the specific information on the second information bus (26).

2. A motor-vehicle air-conditioning device comprising a motor-driven fan unit (100;1000) and a number of elements (12, 14, 16) connected to voltage-supply means, wherein said motor-driven fan unit further comprises an energy-distribution unit (20;200) comprising an energy-supply input (32) for receiving an input voltage (18), an energy output (34), and a voltage-regulation, protection and filtering assembly (30; 300) connected between the energy-supply input and the energy output, and a security protected energy bus (22) linked to the energy output of the energy-distribution unit (20;200) and powering said number of elements, wherein the energy-distribution unit (200) is installed in the motor-driven fan unit.

3. The device according to claim 2, wherein the energy-distribution unit (200) is installed in a motor-control module (600) of the motor-driven fan unit (1000).

4. The device according to claim 3, wherein the energy-distribution unit (200) receives a filtered voltage from a filtering circuit (110) of the motor-control module (600) of the motor-driven fan unit (1000).

5. A motor-vehicle air-conditioning device comprising a motor-driven fan unit (100;1000) and a number of elements (12.14, 16) connected to voltage-supply means, wherein said motor-driven fan unit further comprises an energy-distribution unit (20;200) comprising an said energy-supply input (32) for receiving an input voltage (18), an energy output (34), and a voltage-regulation, protection and filtering assembly (30; 300) connected between the energy-supply input and the energy output, and a security protected energy bus (22) linked to the energy output of the energy-distribution unit (20;200) and powering said number of elements, wherein the energy-distribution unit (200) is installed in the motor-driven fan unit wherein the energy-distribution unit (200) is installed in a motor-control module (600) of the motor-driven fan unit (1000).

6. A motor-vehicle air-conditioning device comprising a motor-driven fan unit (100;1000) and a number of elements (12, 14, 16) connected to voltage-supply means, wherein said motor-driven fan unit further comprises an energy distribution unit (20;200) comprising an said energy-supply input (32) for receiving an input voltage (18), an energy output (34), and a voltage-regulation, protection and filtering assembly (30; 300) connected between the energy-supply input and the energy output, and a security protected energy bus (22) linked to the energy output of the energy-distribution unit (20;200) and powering said number of elements, wherein the energy-distribution unit (20) is installed in a. control panel (14) of the air-conditioning device.

* * * * *